No. 616,029. Patented Dec. 13, 1898.
J. F. STEWARD.
GRAIN HARVESTER.
(Application filed Feb. 1, 1897.)
(No Model.) 2 Sheets—Sheet 1.
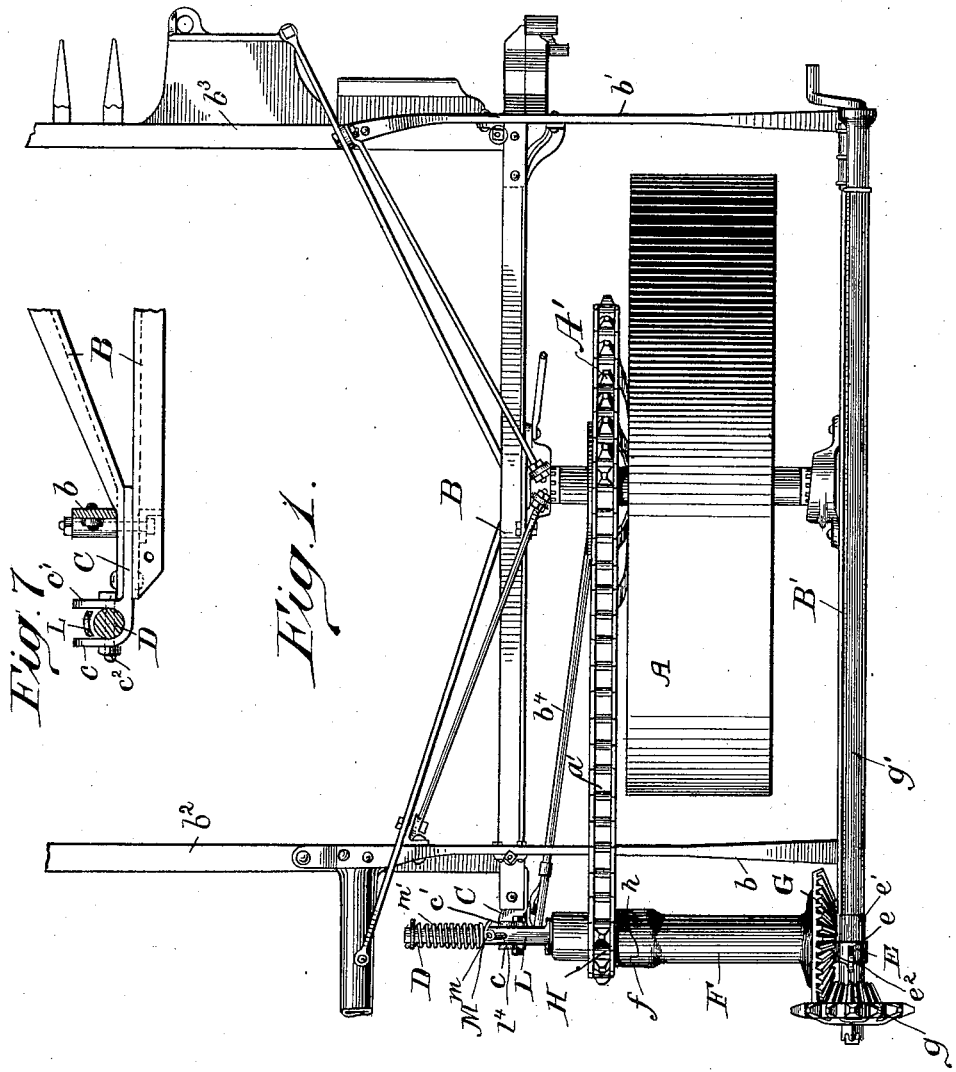
Witnesses
Arthur Johnson
Chas. A. Steward
Inventor.
John F. Steward No. 616,029. Patented Dec. 13, 1898.
J. F. STEWARD.
GRAIN HARVESTER.
(Application filed Feb. 1, 1897.)
(No Model.) 2 Sheets—Sheet 2.
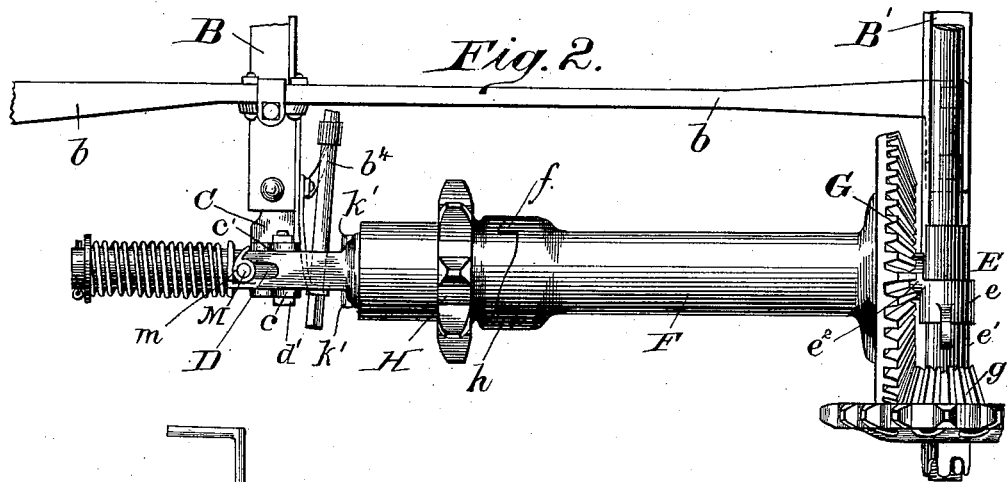
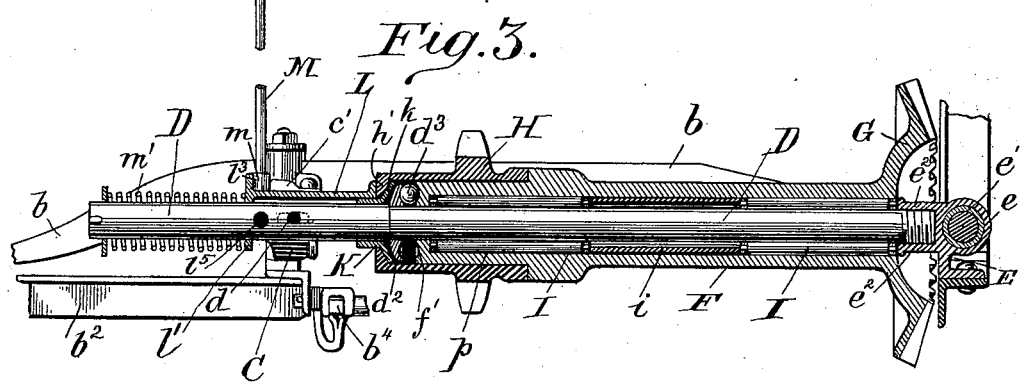
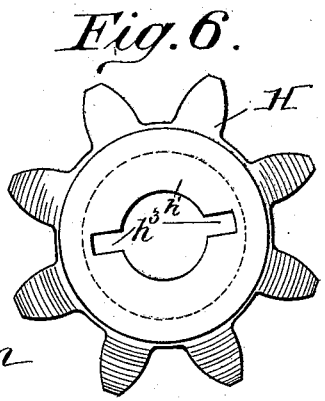
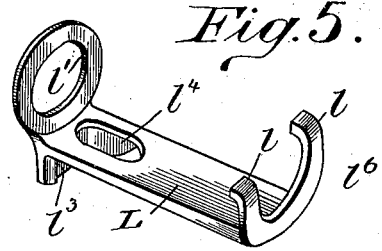
Witnesses.
Arthur Johnson
E. A. Eldred
Inventor.
John F. Steward

UNITED STATES PATENT OFFICE.

JOHN F. STEWARD, OF CHICAGO, ILLINOIS.

GRAIN-HARVESTER.

SPECIFICATION forming part of Letters Patent No. 616,029, dated December 13, 1898.

Application filed February 1, 1897. Serial No. 621,582. (No model.)

*To all whom it may concern:*

Be it known that I, JOHN F. STEWARD, of Chicago, in the county of Cook and State of Illinois, have invented certain new and useful Improvements in Grain-Harvesters, of which the following is a full description, reference being had to the accompanying drawings, in which—

Figures 1 and 2 are plan views illustrating my invention and so much of the framework of a harvesting-machine as is necessary to make the same clear. Fig. 3 is a rear sectional elevation of the clutching mechanism, and Figs. 4, 5, 6, and 7 are details.

The object of the invention is to provide gearing and clutching devices that shall be durable and efficient, to provide a supporting-shaft for the gearing that will admit of regulation of the mesh of the gearing, and to adopt a main wheel-frame to properly sustain the gearing-supports and admit of adjustment of the gearing.

In the drawings, A is a master-wheel suitably journaled on a stationary axle, which axle is suitably sustained at its ends in the trusses B and B'.

$b$ is a forged bar suitably secured at its stubble end to the bar B' and at its grain end to the platform-sill $b^2$. It crosses the truss-bar B near its rear end and is secured thereto by suitable bolts.

$b'$ is the front sill, secured at its grain end to the truss-bar B' and at its other end to the finger-bar $b^3$. It crosses the truss-bar B near the front end of the latter and is there duly secured, so that in the parts B, B', $b$, and $b'$ I have a quadrangular frame surrounding the wheel and the latter journaled therein. The axle is provided at its ends with suitable pinions that roll in curved racks that admit of the frame being raised and lowered on the wheel. The act of raising and lowering is through the instrumentality of a worm-wheel and worm, as usual, the shaft $b^4$ representing the means by which the vertical adjustment of the frame is effected. The truss-bar B is suitably braced to the platform-bar at the rear and the finger-bar at the front. In order to support my gearing, I extend the truss-bars B and B' some distance rearward beyond the frame-bar $b$.

C is a casting secured to the rear end of the truss-bar B and so shaped as to permit the gear-shaft D to lie therein. In order to form a suitable rest for the shaft, I carry two lugs $c$ and $c'$ upward and provide them with a slotted hole, as shown in Fig. 3, through which a bolt may be placed and also passed through the hole $d$ in the shaft D. The purpose of slotting the hole in the lugs is so that the shaft D may be free to be moved endwise.

E is a support secured to the rear end of the truss-bar B', provided with a sleeve-like portion $e$, into which the journal-bearing $e'$ may be thrust, and an internally-threaded sleeve $e^2$, projecting stubbleward, into which the threaded stubble end of the shaft D may be screwed.

$d'$ is a bolt passing through the lugs $c$ and $c'$ and through the hole $d$ in the shaft. It will be readily understood that if the bolt $d'$ is removed the shaft may be screwed into the sleeve-like portion $e^2$ of the casting E. As suitable means for turning the shaft when an adjustment lengthwise is required I provide the shaft with the series of holes $l^5$ and by inserting a punch or suitable tool in one of them and use it as a lever. Another use of the hole $l^5$ will be hereinafter explained.

F is a bevel-gear sleeve having the clutch-teeth $f$ a suitable distance from one end and the bevel-gear G secured to its other end, preferably cast as one piece therewith. The clutch end of the sleeve is a straight cylinder $p$ for a sufficient distance to support the clutch sprocket-wheel H and permit it to slide thereon. The latter receives rotation from the wheel A by means of the sprocket-wheel A' and chain $a'$. It is also provided with the teeth $h$, adapted to mesh into those $f$ of the sleeve F. In the clutch end of the sleeve F, I form an annular groove $f'$, and on the shaft D, I shrink or otherwise secure a grooved collar $d^2$. The groove in the collar and that in the end of the sleeve are of substantially the same diameter, and a ball $d^3$ is so placed as to lie in each. The bevel-gear intermeshes with the pinion $g$, thereby transmitting rotation to the crank-shaft $g'$, to which the latter is secured. The ball placed at the end of the sleeve serves as antifriction means for preventing the pressure between the gear and pinions from working the latter two apart. The crank-shaft bearing being sustained in the bracket E and the threaded sleeve-like portion $e^2$ being as one piece therewith, it will be readily seen that if the shaft D be rotated in the proper direction it will be screwed into the sleeve-like portion of the bracket E and the sleeve and bevel-gear be carried therewith. By this means the depth of mesh may be regulated and wear compensated for. The sleeve F is bored considerably larger than the shaft for nearly its whole length and the roller-bearings I and I placed therein. In order to prevent the roller-bearings from moving from their end positions in the sleeve, a distance-sleeve $i$ is placed between them. In order to restrict the dimensions of the clutch and sleeve, I do not bore the latter its larger size all the way through, but leave an internal flange at its clutch end sufficiently thick to enable me to form therein the ball-race.

The hub of the clutch is made long enough to extend some distance beyond the end of the sleeve F for purposes that will now be explained. The hub is provided with an inward-reaching flange $h'$. Surrounding the shaft D is the loose collar K, having the flange $k$ and the bosses $k'$. The inwardly-directed flange of the sprocket-wheel hub is notched at $h^3 h^3$, as shown in Fig. 6. In assembling the parts the collar K is passed into the hub of the sprocket-wheel and the bosses $k' k'$ are passed through the notches $h^3$ and $h^3$, when the sprocket-wheel hub and the collar K assume the relative position shown in Fig. 3.

L is the clutch-pull, having the hooks $l l$ and the eye $l'$. After the collar K is put in position the hooks $l$ are made to engage the bosses $k' k'$ and the parts placed in alinement. The shaft D is then thrust through the eye $l'$, through the collar K, and through the sprocket-wheel hub. The sleeve F is then thrust onto the shaft and its clutched end into the sprocket-wheel hub. The roller-bearing cages and the sleeve $i$ are then placed within the sleeve and upon the shaft. With the parts thus placed the shaft D is laid into the recesses formed between the lugs $c$ and $c'$ and its threaded end screwed into the sleeve-like projection $e^2$. As the shaft is screwed into the part $e^2$ the bevel-gear is drawn into mesh with the pinion.

Upon the upper side of the clutch-pull is a short vertical wall $l^3$, and through that portion which lies along over the shaft is the slot $l^4$.

M is a shaft having the cam $m$ secured thereto, with its lower end extended through the slot $l^4$ and far enough into any of the holes $l^5$ of the shaft D to properly sustain it. The upper end of the shaft M (cut away in the figures) in practice extends to within a reasonable distance of the driver's seat, so that by turning it in the proper direction the cam $m$ is forced against the upwardly-projecting wall $l^3$ and the clutch-pull thus moved longitudinally and through the instrumentality of the collar K the movable clutch drawn from its mate on the sleeve F. The shaft M, extending through the clutch-pull, prevents the latter from turning upon the shaft D. It lies between the upper ends of the lugs $c$ and $c'$, which also help to hold it in place. It is not necessary that the two precautions shown be resorted to to prevent it from turning; but either can be used, or, in fact, any other suitable means. I have resorted to several means for so connecting the clutch-pull to the clutch as to properly pull the latter; but I prefer to extend it, in effect, to a point within the hub of the clutch, so that it is protected from sand and dirt. The sleeve K may be considered as in fact a part of the clutch-pull. I have so constructed the parts as to make them in fact one; but as I wish the surface $k$ to be sufficient to prevent undue wear I construct the part K as shown. The end $l^6$ of the pull L is adapted to bear against the end of the hub of the sprocket-wheel, and the ring $l'$ receives against its outer side the end of the pressure of the spring $m'$, supported upon the shaft and there held by suitable washer and pin. It is preferable to make the clutches slightly hooking, as shown in Figs. 1 and 2, so that there will be no tendency for them to move apart when in labor. The object of so making them is to avoid the necessity of forcing them together by means of the spring, for the pressure of the latter would hold the surface $l^6$ in constant engagement with the end of the clutch sprocket-wheel and produce unnecessary wear. The parts are preferably so constructed that the wall $l^3$ shall engage the hub of the cam $m$ and prevent the pull from being forced unnecessarily far against the end of the hub. It is well to permit the spring to force the clutch fully home, and so no space between the surface $l^6$ and end of the hub is shown. In practice if no freedom is provided it is soon found to be present because of wear of the two parts; but after the freedom is once accomplished no friction or further wear results. The difficulty encountered with clutches that run constantly and are drawn out of engagement and held under pressure is that the parts in contact wear rapidly. By placing said contact-surface within the hub of the clutch, where oil is always present, I avoid the accumulation of sand and dirt therein. The distance between the axle and the shaft D is considerable relative to the size of the sprocket-wheels, so that the clutch H may be moved sidewise sufficiently to disengage from its mate, and the chain, somewhat flexible because of its loose joints, may be permitted to run.

What I claim as my invention, and desire to secure by Letters Patent, is—

1. The combination of a stationary shaft, adjustable longitudinally, a bevel-gear having a clutch-face and adapted to revolve on said shaft, a shaft having a pinion intermeshing with said gear, a clutch sprocket-wheel rotatably mounted on the hub of the bevel-gear and adapted to engage the clutch-face of said gear, means for adjusting the stationary shaft longitudinally, and clutch-controlling mechanism mounted on said stationary shaft and adapted to move therewith when said shaft is adjusted, said mechanism being suitably connected to the hub of said clutch sprocket-wheel, substantially as described.

2. The combination of a stationary shaft, adjustable longitudinally, a bevel-gear having a clutch-face and adapted to revolve on said stationary shaft, a shaft having a pinion intermeshing with said gear, a clutch sprocket-wheel supported on said stationary shaft and adapted to revolve on the extended hub of said bevel-gear, and also adapted to slide thereon and engage the clutch-face of the said bevel-gear, the said shaft having a collar adapted to resist the end thrust or the bevel-gear, means for adjusting the stationary shaft longitudinally, whereby the amount of mesh of the gearing may be regulated, and means internally connected with said clutch for withdrawing it from engagement with the clutch-face upon the bevel-gear, all combined substantially as described.

3. The combination with the main frame, of the support E secured thereto and having the journal-bearing $e'$, the sleeve $e$, and the threaded sleeve $e^2$, the crank-shaft journaled in the bearing $e'$, the stationary shaft D screwing into the threaded sleeve $e^2$, the sleeve F, the bevel-gear G, the sprocket-wheel H, the clutch-faces between said sleeve and wheel, and a clutch-operating device, the wheels G and H and the clutch-operating device being carried by the shaft D, substantially as described.

4. The combination of a stationary shaft, a bevel-gear loosely mounted thereon and having a clutch-face on its hub, a ball-bearing between the end of said hub and a collar on the shaft, and a clutch sprocket-wheel loosely mounted on said hub and adapted to slide thereon to engage said clutch-face, the hub of the sprocket-wheel being adapted to cover said ball-bearing and thus shield it from dirt, substantially as described.

5. The combination of a stationary shaft, longitudinally adjustable, a bevel-gear loosely mounted thereon, a ball-bearing between the end of the hub of said gear and a collar on the shaft, a clutch-face on the gear, a clutch sprocket-wheel mounted on the hub of said gear and adapted to engage said clutch-face, a collar loosely mounted upon said shaft and having a flange adapted to engage the end of the hub of the sprocket-wheel, a clutch-pull adapted to slide upon said stationary shaft and to engage projections upon said loosely-mounted collar, a spring adapted to act upon said clutch-pull to normally hold the sprocket-wheel in engagement with said clutch-face, and means for moving said clutch-pull and holding the wheel out of engagement with the clutch in opposition to the stress of said spring, substantially as described.

6. The combination of a stationary shaft, longitudinally adjustable, a bevel-gear loosely mounted thereon, a ball-bearing between the end of the hub of said gear and a collar on the shaft, a shaft having a pinion adapted to mesh with said gear, a clutch-face on the bevel-gear, a clutch sprocket-wheel rotatably mounted on the hub of said gear and adapted to engage said clutch-face, means for adjusting said stationary shaft longitudinally, whereby the mesh of said gear and pinion is regulated and thus wear compensated for, and clutch-controlling mechanism mounted on said stationary shaft and adapted to move longitudinally therewith and also to receive an independent longitudinal movement thereon to disengage said clutch, substantially as described.

7. The combination of a stationary shaft, longitudinally adjustable, a bevel-gear loosely mounted thereon, a ball-bearing between the end of the hub of said bevel-gear and a collar on the shaft, a shaft having a pinion adapted to mesh with said gear, a clutch-face on the bevel-gear, the clutch sprocket-wheel rotatably mounted on the hub of said gear and adapted to engage said clutch-face, means for adjusting said stationary shaft longitudinally, whereby the mesh of said gear and pinion is regulated and thus wear compensated for, and clutch-controlling mechanism mounted on said stationary shaft and adapted to be carried with the shaft as it is moved longitudinally and also to receive an independent longitudinal movement thereon, substantially as described.

8. The combination of a shaft, longitudinally adjustable, a gear on said shaft, a clutch rotatably mounted on the hub of said gear, and a clutch-pull mounted on said shaft and adapted to reach into the hub of said clutch to grasp it, said pull being also arranged to bear against the outside of said hub, whereby the clutch and its pull are adapted to be carried with said shaft when it is adjusted longitudinally, substantially as described.

9. The combination of a shaft, longitudinally adjustable, a gear on said shaft, a clutch rotatably mounted on the hub of said gear, a clutch-pull mounted on said shaft and adapted to bear against the hub of said clutch, and a loose collar upon said shaft inside said hub, said collar having bosses adapted to protrude through the end of said hub and be engaged by the clutch-pull, whereby the clutch and its pull are adapted to be carried with said shaft when it is adjusted longitudinally, substantially as described.

JOHN F. STEWARD.

Witnesses:
ARTHUR JOHNSON,
E. A. ELDRED.